(12) United States Patent
Bricker et al.

(10) Patent No.: US 7,148,835 B1
(45) Date of Patent: Dec. 12, 2006

(54) METHOD AND APPARATUS FOR IDENTIFYING OWNSHIP THREATS

(75) Inventors: Jeffrey K. Bricker, Apalachin, NY (US); Anthony J. Gounalis, Endicott, NY (US); James C. Rosswog, Endicott, NY (US); Stephen P. Wanchissen, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/166,405

(22) Filed: Jun. 24, 2005

(51) Int. Cl.
*G01S 7/40* (2006.01)
*H04K 3/00* (2006.01)

(52) U.S. Cl. .................. 342/20; 342/13; 342/89; 342/175; 342/195

(58) Field of Classification Search ........... 342/13–20, 342/74–81, 89, 90, 165, 173, 175, 192–197, 342/450–465
See application file for complete search history.

(56) References Cited

U.S. PATENT DOCUMENTS

| | | | | |
|---|---|---|---|---|
| 2,522,551 | A | * | 9/1950 | Williams ................ 342/20 |
| 2,602,883 | A | * | 7/1952 | Koontz et al. ............ 342/13 |
| 3,500,401 | A | * | 3/1970 | Miller et al. ............ 342/20 |
| 3,660,844 | A | * | 5/1972 | Potter .................. 342/20 |
| 3,671,964 | A | * | 6/1972 | Trochanowski et al. ... 342/20 |
| 4,146,892 | A | * | 3/1979 | Overman et al. .......... 342/20 |
| 4,182,990 | A | * | 1/1980 | Coffin et al. ............ 342/20 |
| 4,839,658 | A | | 6/1989 | Kathol et al. |
| 4,851,854 | A | | 7/1989 | Drogin, deceased |
| 4,853,700 | A | | 8/1989 | Funatsu et al. |
| 4,860,013 | A | * | 8/1989 | Huntley ................ 342/20 |
| 5,063,385 | A | * | 11/1991 | Caschera ................ 342/13 |
| 5,122,801 | A | | 6/1992 | Hughes |
| 5,157,615 | A | | 10/1992 | Brodegard et al. |
| 5,287,110 | A | | 2/1994 | Tran |
| 5,307,289 | A | | 4/1994 | Harris |
| 5,361,069 | A | * | 11/1994 | Klimek et al. ........... 342/20 |
| 5,406,286 | A | | 4/1995 | Tran et al. |
| 5,550,546 | A | * | 8/1996 | Noneman et al. ......... 342/13 |
| 5,838,262 | A | | 11/1998 | Kershner et al. |
| 6,043,771 | A | * | 3/2000 | Clark et al. ............ 342/13 |
| 6,184,831 | B1 | | 2/2001 | Dalby et al. |
| 6,292,136 | B1 | | 9/2001 | Egnell |
| 6,615,138 | B1 | | 9/2003 | Schiffmann et al. |
| 6,785,610 | B1 | | 8/2004 | Baker et al. |
| 6,792,383 | B1 | | 9/2004 | Brouillard et al. |
| 6,831,589 | B1 | * | 12/2004 | Shearer, III ........... 342/20 |
| 6,842,137 | B1 | * | 1/2005 | Gounalis ............... 342/20 |
| 6,917,325 | B1 | * | 7/2005 | Gounalis ............... 342/20 |
| 2004/0027257 | A1 | | 2/2004 | Yannone et al. |
| 2004/0068372 | A1 | | 4/2004 | Ybarra et al. |
| 2004/0113832 | A1 | * | 6/2004 | Gounalis ............... 342/13 |
| 2004/0140912 | A1 | | 7/2004 | Alfredsson et al. |

* cited by examiner

*Primary Examiner*—Bernarr E. Gregory
(74) *Attorney, Agent, or Firm*—Wolf, Greenfield & Sacks, P.C.

(57) ABSTRACT

A method and apparatus for evaluating whether one or more threat sources is actively tracking an object, such as an aircraft. A tracking system may analyze information regarding signals received from a source and provide a track indication that the source is actively tracking the object without adjusting the dwell arrangement of the scan strategy of the receiver. A track indication may be provided where a sample count of signal intercepts from the source is greater than a track count during a window. A break track indication representing that the source is not actively tracking the object may be provided when a number of signal intercepts from the source is less than a break track count during a window.

20 Claims, 4 Drawing Sheets

METHOD AND APPARATUS FOR IDENTIFYING OWNSHIP THREATS

FEDERALLY SPONSORED RESEARCH

This invention was made with Government support under U.S. Government Contract #N00019-93-C-0196 with the U.S. Navy. The Government may have certain rights to this invention.

BACKGROUND OF INVENTION

1. Field of Invention

This invention relates to methods and apparatus for identifying ownship threats, such as weapon targeting systems used to track aircraft or other objects.

2. Related Art

Aircraft, including airplanes, helicopters and other similar objects used in both military and civilian applications, may be equipped with threat identification systems that identify threats to the aircraft, such as surface-to-air missile systems or other weapon systems. Such weapon systems typically emit radar-based or other signals in an effort to track, identify and locate aircraft or other objects. By identifying the location and trajectory of an aircraft, a weapon system may deploy a missile or other device in an effort to destroy or disable the aircraft. Aircraft threat identification systems typically include a receiver that receives signals emitted by one or more threats and are capable of identifying a weapon system as a threat based on the signals emitted by the weapon system. Once a threat is identified, the aircraft may take evasive action, deploy countermeasures or employ other efforts to thwart the weapon's ability to engage the aircraft.

SUMMARY OF INVENTION

The inventors have appreciated that some existing threat identification systems require the dedication of receiver resources to a suspected threat in order to determine whether the threat is real, that is, to determine whether or not the threat is actually targeting the aircraft. For example, in some such systems, receiver resources must be dedicated to "looking" in a suspected threat's direction for a longer period of time than would otherwise be used in order to determine whether the threat is tracking the aircraft or not. Dedication of receiver resources frequently requires an adjustment in dwell time, i.e., an amount of time that a receiver devotes its attention to receiving signals from one or more directions. Adjustments in dwell time for the receiver resources may result in the receiver not looking in the direction of other threats, potentially preventing the system from identifying emerging threats in as timely a manner as it would otherwise. In addition, increased dwell times for suspected threats may reduce the total number of threats that the system can evaluate since the system may only be capable of devoting a certain total amount of time to threat assessment.

In one aspect of the invention, a threat evaluation system may identify a particular threat as a real one, i.e., that the threat is actively tracking the aircraft or other object associated with the threat evaluation system, without effecting any dwell arrangement changes or other characteristics of the receiver operation. That is, in one aspect of the invention, a scan strategy used by a receiver to receive signals emitted by one or more threat sources need not be adjusted for the threat evaluation system to determine that a particular threat source is actively tracking the object. This capability to identify threats as real or not without changing the dwell time or other scan characteristics of the receiver may enable the system to assess a potentially larger number of threats since the receiver need not be required to spend "extra" time receiving signals in any particular direction or frequency band. Some embodiments in accordance with the invention may be capable of evaluating a theoretically infinite number of threats, limited only by the amount of processing power available to evaluate signals received by the receiver.

In one aspect of the invention, a threat evaluation system includes a receiver associated with an object. The receiver is adapted to implement a scan strategy, including a dwell arrangement, and receive signals emitted by one or more sources to locate the object or similar items. A tracking system receives information from the receiver regarding received signals and analyzes these signals to provide an indication that the object is being actively tracked by one or more sources. The tracking system may provide the track indication based on its analysis and without adjusting the dwell arrangement of the scan strategy of the receiver.

In another aspect of the invention, a threat evaluation system includes a receiver associated with an object. The receiver is adapted to receive signals emitted by one or more sources to locate the object or similar items and to provide an indication of at least one signal intercept from a source based on one or more signals received from the source. A tracking system may receive information from the receiver regarding signal intercepts and analyze at least one signal intercept from the source. Based on its analysis, the tracking system may provide an indication that the source is actively tracking the object when a sample count of signal intercepts from the source is greater than a track count during a window, and/or provide a break track indication that the source is not actively tracking the object when a number of signal intercepts from the source is less than a break track count during a window.

In another aspect of the invention, a method of identifying one or more threats to an object includes implementing a scan strategy for a receiver, where the scan strategy includes a dwell arrangement defining one or more time periods during which the receiver is intended to receive signals from one or more directions. Signals emitted by one or more sources to locate an object, associated with a receiver, are received at the receiver. A track indication may be provided that indicates at least one source is actively tracking the object based on the received signals and without adjusting the dwell arrangement of the scan strategy for the receiver.

These and other aspects of the invention will be apparent and/or obvious from the following description.

BRIEF DESCRIPTION OF DRAWINGS

Aspects of the invention are described below with reference to the following drawings in which like numerals, reference like elements, and wherein.

DETAILED DESCRIPTION

Figure 1:
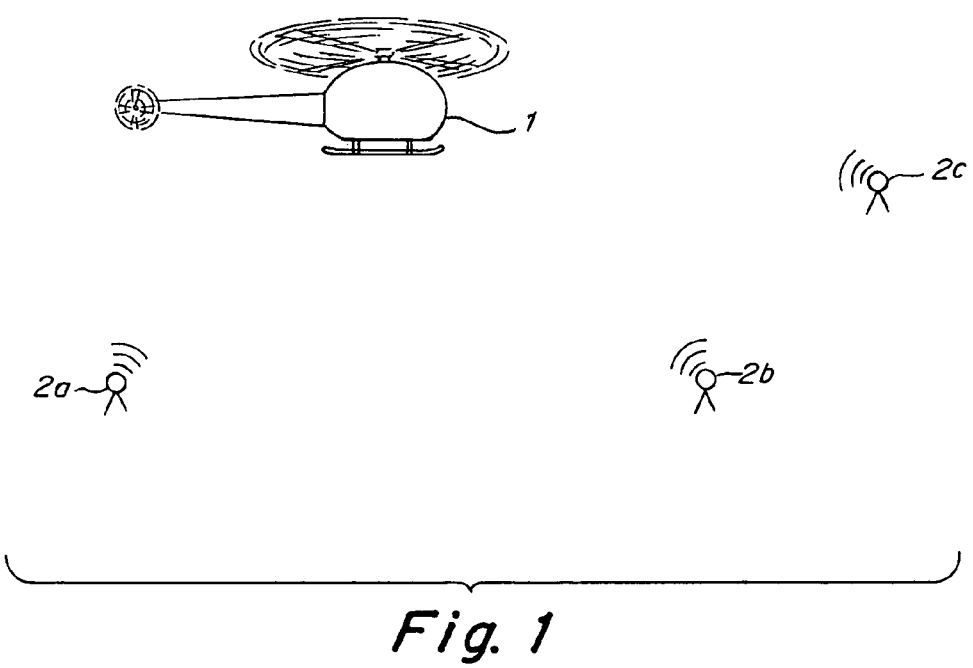
FIG. 1 is a schematic diagram of an object, e.g., a helicopter, and a plurality of threat sources.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Aspects of the invention are described below with reference to illustrative embodiments. It should be understood that reference to these illustrative embodiments is not made to limit aspects of the invention in any way. Instead, illustrative embodiments are used to aid in the description and understanding of various aspects of the invention. Therefore, the following description is intended to be illustrative, not limiting.

In one aspect of the invention, a threat evaluation system can provide a track indication representing that a particular threat source is actively tracking an object without requiring any adjustment in the scan strategy of a receiver. That is, the receiver may passively receive signals from a plurality of different directions and/or different frequencies, e.g., to detect signals from one or more emitters associated with one or more threats. The receiver may receive these signals using a scan strategy, i.e., a predetermined dwelling sequence by which the receiver detects signals from each of a plurality of different directions and/or frequencies for a specified time period. For example, the receiver may detect signals in a first direction and frequency for a first time period, then detect signals in a second direction and frequency for a second time period, and so on until returning to detect signals in the first direction and frequency, then repeating the sequence again. By employing the scan strategy, the receiver may detect signals from different threat sources located in different directions and identify such information as the direction from which the signals were received, the signal amplitude, the time the signal was received, etc. The scan strategy may include a dwell arrangement, i.e., the set time periods during which the receiver "looks" at particular directions and/or frequencies. The different time periods used for each direction/frequency may be adjusted in any suitable way, as is known in the art. The receiver may categorize or otherwise identify signals as originating from a particular threat source, and provide signal intercept information for each threat source to a tracking system for analysis. The signal intercept information may indicate an identity of a threat source from which the signal(s) was received, an amplitude of the signal(s), a time of arrival of the signal(s) and/or other information. Using this signal intercept information, the tracking system may determine whether or not one or more threat sources are actively tracking the object, and provide a suitable indication. However, as is described in more detail below, although the receiver may adjust its scan strategy for other reasons, the receiver need not necessarily adjust the scan strategy to enable the tracking system to identify whether or not a particular threat source is actually tracking the object.

Embodiments that do not require an adjustment in the scan strategy for the receiver may enable the tracking system to analyze the signals received from more threat sources than would otherwise be possible, e.g., as compared to systems that adjust a dwell time for the receiver when attempting to determine whether the threat source is actively tracking the object. That is, systems that require a receiver to adjust a dwell time so that signals are received for a longer period of time in the direction of a suspected threat reduce the amount of time that the receiver has for "looking" for or monitoring other threats. As a result, such systems may be limited in the number of threats that can be reliably identified and/or evaluated.

In another aspect of the invention, criteria that the tracking system uses to analyze signals received from a particular threat source may be customized for each threat source. That is, the object associated with the tracking system may encounter a plurality of different threats that each use different strategies to identify targets. For example, one threat source may use a first signal frequency when searching for a target, and then switch to a second frequency when tracking a target. Another threat source may use the same signal frequency for searching and tracking, but may use an increased scan rate when tracking a target. Yet another threat may use the same signal frequency for searching and tracking, and may scan when searching for a target, but may stop scanning when tracking a particular target. Another threat may use two or more signal types for searching, and two or more signal types for tracking. The signals from each of these different threats may be analyzed by the tracking system using different criteria, enabling the system to better identify whether or not a threat is tracking the object in question.

In another aspect of the invention, a tracking system may group signal intercepts from a threat source together and perform an analysis on the group of signals to determine whether or not the source is actively tracking the object. In one embodiment, a group of signals associated with a particular source is referred to as a "window." The window may include signals of any type that are associated with the source, such as a plurality of similar signals, e.g., signals at the same frequency, pulse width, pulse rate, etc., or may include signals with characteristics that are different from each other. For example, a threat source may always use signals that are at the same frequency, pulse width and pulse rate for searching and/or tracking. As signals from this source are received at different time intervals, the signal intercepts may be identified as being associated with the same source and grouped together into a common window. Other threats may use signals of different types, such as signals at a first frequency for scanning, and signals at one or more different frequencies when tracking. As these different signals are received over time, they may be identified as originating from or otherwise be associated with the same threat source and grouped into a single composite window. The tracking system may perform its analysis on the signals in the composite window to determine whether or not the source is actively tracking the object.

In one embodiment, the tracking system may analyze signal intercepts in a window, and provide a track indication representing that the source is actively tracking the object when a number of the signal intercepts in the window is greater than a track count, which is equivalent to the signal intercept rate exceeding a track rate. Conversely, a tracking system may provide a break track indication that the source is not actively tracking the object when a number of signal intercepts in the window is less than a break track count, which is equivalent to the signal intercept rate falling below the break track rate. As is described in more detail below, the track count and the break track count (or track rate and break track rate) may be different than each other, providing a hysteresis function, e.g., to help the tracking system avoid thrashing or toggling situations where track and break track indications are alternately provided on a rapid basis. The tracking system may also incorporate a feature whereby signal intercepts during the window are only counted for determining whether to indicate a track indication if a signal in the window has an amplitude that exceeds a predetermined amplitude threshold. This may help the system disregard low amplitude signals that are unlikely to be able to be used by the threat source in tracking the object. The tracking system may also incorporate a feature whereby signal intercepts in a window are only analyzed to determine whether to issue a track indication if at least one of the signal intercepts has an amplitude above a specified level. Once exceeded, the predetermined amplitude threshold and specified levels may be adjusted based on the observed peak amplitudes of the signal intercepts within the window.

FIG. 1 shows an object 1 that may be targeted by one or more threat sources 2. In this illustrative embodiment, the object 1 is a helicopter, but the object may be any suitable type of aircraft, such as a fixed-wing aircraft, rotary-wing aircraft, dirigible, or airship, a land-based vehicle, a water-born vehicle, etc. In short, the object 1 may be any suitable device, including manned or unmanned vehicles. The threat sources 2 may also be any suitable type of device or group of devices, such as a tracking system for a missile launcher or other weapon, or any other device used for determining the location, direction of travel, and so on, of objects 1. Thus, the threat sources 2 need not necessarily be associated with a weapon system. Each of the threat sources 2 may emit signals for identifying objects. These signals may be any suitable type of electromagnetic radiation, such as radar waves, and may have any suitable format. For example, radar signals may be emitted in pulses having a defined pulse width, pulse repetition rate, amplitude, frequency, or other characteristics. Also, each source 2 may emit signals of different types. For example, a particular source may emit one or more signal types when searching for objects, and then switch to emitting one or more different signal types after having initially identified an object and when attempting to track the object, e.g., to determine a more precise location, direction of travel, speed or other characteristics of the object's movement. As briefly discussed above, sources may operate in any suitable way. For example, a source 2 may emit signals in one or more directions in a steady or otherwise non-variable manner. Other sources may emit signals in a region by scanning. The source may switch between signal emission modes in any suitable way, such as emitting signals in a slow scan mode when searching for objects, and emitting signals in a fast scan mode when tracking an object. Different operating modes for threat sources, particularly those associated with weapon systems, are well known in the art, and therefore not described in detail herein.

The object 1 may include a receiver that passively receives signals from one or more sources 2 and a tracking system that analyzes received signals to determine whether one or more sources 2 are actively tracking the object 1 with which the tracking system is associated. The tracking system may operate on a general purpose computer or other data processing device onboard the object 1, or operate at a location remote from the object 1, such as in a nearby land-based or air-based support vehicle. As will be understood by those of skill in the art, the object 1 and/or an operator of the object 1 may use information from the tracking system in any suitable way. For example, if the tracking system indicates that a threat source 2 is actively tracking the object 1, a pilot may take evasive action or otherwise maneuver the object 1 so as to prevent or reduce the threat source's 2 ability to track the object 1. Alternately, or in addition, the object 1 may include automated systems that may react to a tracking indication provided by the tracking system to help thwart the threat source's ability to track the object 1, such as by emitting jamming signals, initiating an evasive maneuver, or actuating other countermeasures.

Figure 2:
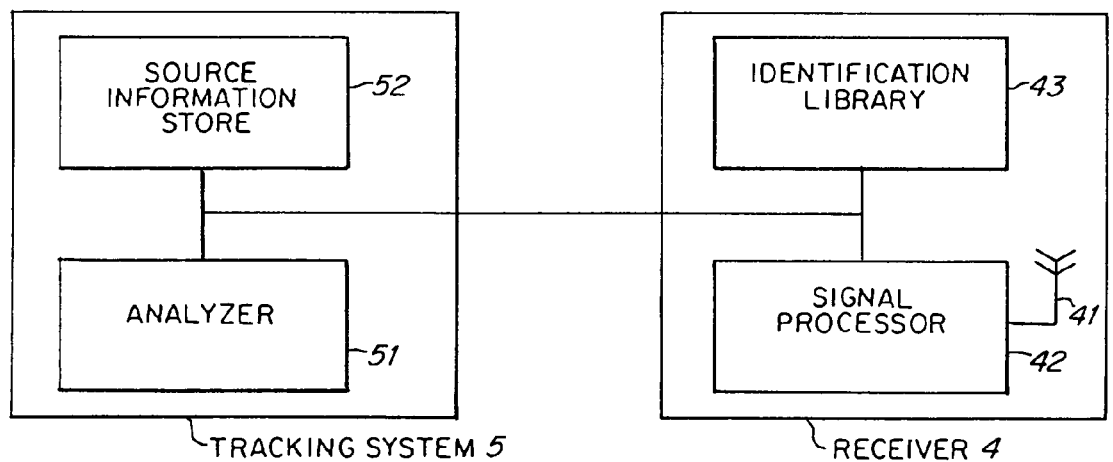
FIG. 2 is a schematic block diagram of a threat evaluation system in accordance with the invention.

FIG. 2 shows a schematic block diagram of a threat evaluation system. In this embodiment, the system includes a receiver 4 arranged to receive signals emitted by one or more threat sources 2. The receiver 4 may include an antenna 41, which may include any suitable device or devices for receiving signals from sources 2. For example, the antenna 41 may include a stationary or movable reflector structure with a signal receiving device, a phased array of a plurality of antennas, or other suitable arrangement. The antenna 41 may be controlled to receive signals from one or more directions relative to the object 1, e.g., signals emitted from a cone, fan or other suitably shaped region in any desired direction relative to the object 1. A signal processor 42 may provide control signals to the antenna 41 to control its operation. In addition, the signal processor 42 may receive signal information from the antenna 41 and perform any suitable operation on the received signals to provide information to the tracking system 5 for its analysis. For example, the signal processor 42 may convert signals from the antenna 41 from analog to digital format, determine the time of arrival of signals, associate signals with a source, determine a frequency, amplitude, phase, pulse width, and/or pulse rate of signals, determine a direction from which signals were received, determine whether a threat source is in a searching or tracking mode, etc. The receiver 4 may include an identification library 43 or other suitable arrangement that stores information about one or more sources. For example, the identification library 43 may include information regarding the signal frequency, pulse width, pulse repetition rate, signal amplitude, an expected signal intercept rate, or other characteristics for a plurality of sources. This information may be used by the signal processor 42, e.g., to compare characteristics of received signals to information stored in the identification library 43 and thereby identify the received signals as being associated with a particular source and/or determine whether the threat source 2 is in a searching or tracking mode. Such arrangements are known in the art, and thus further details regarding their operation are not provided herein.

The receiver 4 may provide a report or other indication for signal intercepts for one or more sources to the tracking system 5 for its analysis. In some embodiments, the receiver 4 may only provide such signal intercept reports when it is determined that the threat source 2 is likely to be in a tracking mode. Such reports may be generated based on and/or include any suitable information. For example, the antenna 41 may receive one or more sets of signals where each set includes a plurality of radar pulses from a particular direction having a particular frequency, pulse width and pulse repetition rate. The signal processor 42 may use information provided from the identification library 43 to determine that the signals were emitted by a particular threat source 2. The receiver 4 may provide a report to the tracking system 5 regarding this signal intercept that indicates the source identity, a signal amplitude, a time of arrival for the signal intercept and/or other information to the tracking system 5. Thus, the signal intercept reports provided by the receiver 4 may be based on one or a plurality of signals (e.g., signal pulses) received from a source 2.

Based on the signal intercept information, an analyzer 51 in the tracking system 5 may perform an analysis of a most current signal intercept and/or other prior or subsequent signal intercepts from the source 2 to determine whether the source 2 is actively tracking the object 1 or not. As is described in more detail below, the analyzer 51 may use criteria specific to the source when performing its analysis. Such criteria may be obtained from a source information store 52, which may include a database of analysis criteria for a plurality of threat sources. It should be understood that the receiver 4 and tracking system 5 and their respective components may be implemented using any suitable electronic or other components or devices. These components or devices may include any suitable hardware, firmware or other physical devices, and/or any suitable software modules or other data processing information implemented on a computer, computer network or other devices. Communication between the receiver 4 and tracking system 5 may take place over wired or wireless communication links, including one or more networks, dedicated wires or wireless links, etc.

Figure 3:
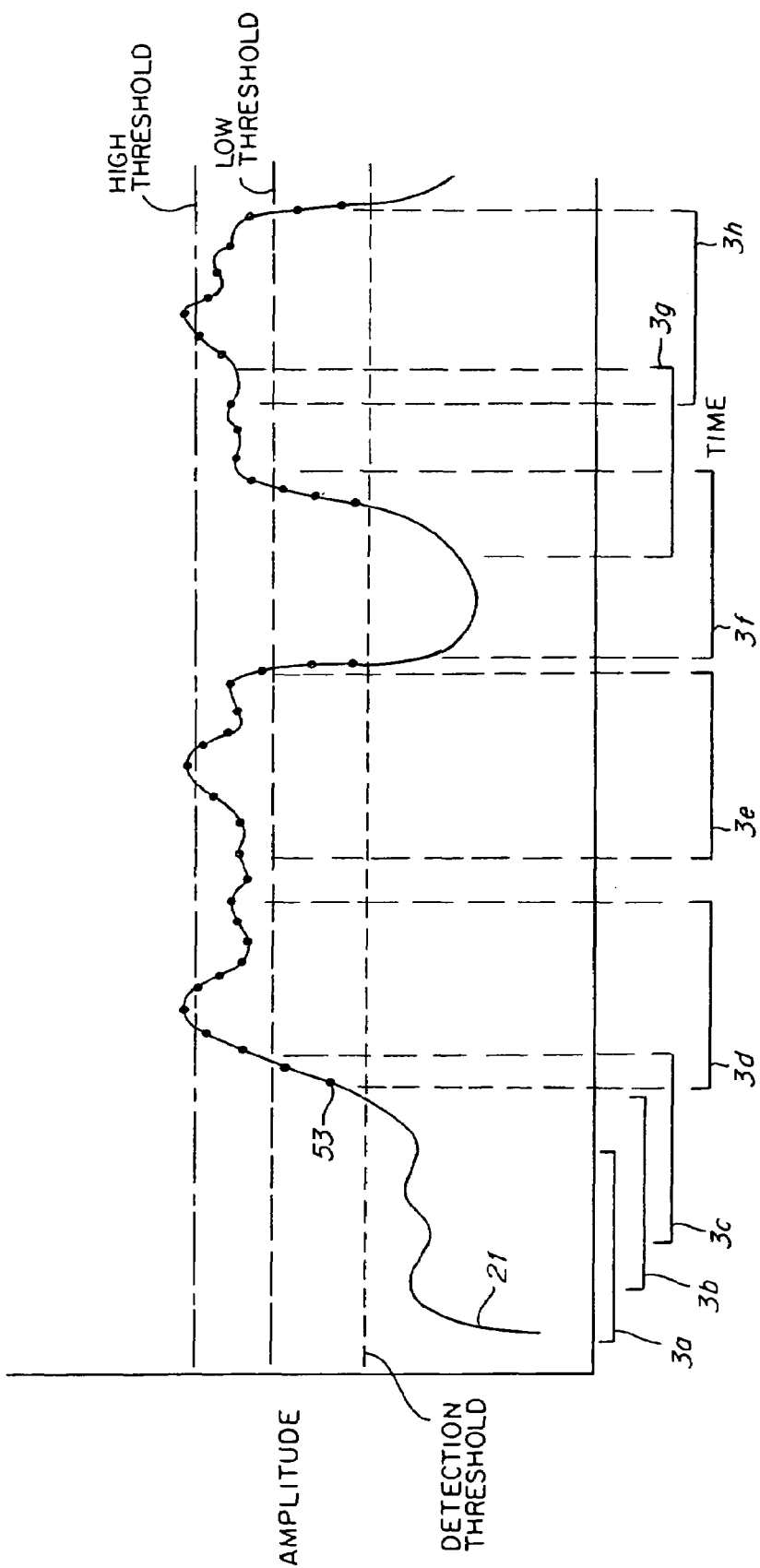
FIG. 3 schematically shows a plurality of signal intercepts with their detected amplitude plotted as a function of time for a particular source.

FIG. 3 shows an exemplary plot of signal amplitude versus time for a plurality of signal intercepts associated with a single source. This plot is used to describe various aspects of the invention, but it should be appreciated that aspects of the invention may be used with any suitable signal intercept profile, not just that shown in FIG. 3. The curve 21 shows the amplitude of signals emitted by the source 2 at the object location. The amplitude of the signals may vary for a variety of reasons, such as movement of the object, movement of the source, scanning of the source (which results in the source emitting signals in directions away from and directly toward the object at different intervals), terrain or weather variations, and so on. Signals emitted by the source 2 that are below a detection threshold of the receiver 4 may not be detected by the receiver 4 or reported to the tracking system 5. It should be understood that the detection threshold shown in FIG. 3 may not necessarily be reflective of the receiver's ability to receive signals from the source 2. Instead, the receiver 4 may actually receive signals from the source 2 at levels below the detection threshold, but not report signal intercepts 53 that have an amplitude below the detection threshold, e.g., because the likelihood of the source being able to track the object when the signal power is below the detection threshold is very low. However, the receiver 4 may report signals received from the source 2 that have an amplitude exceeding the detection threshold. The receiver 4 may report these signals as signal intercepts 53, depicted as dots along the curve 21. As discussed above, signal intercepts 53 may be reported to the tracking system 5 and include the signal amplitude, time of arrival, a source associated with the signal intercept, and potentially other information, such as the signal frequency, phase, pulse rate, pulse width, angle of arrival, and so on.

To perform its analysis, the analyzer 51 may build groups of signal intercepts 53 into windows 3. The analyzer 51 may then perform its analysis of the windows to determine whether or not the source is actively tracking the object. The window size and/or time separation between window start points may be any suitable value, and may depend upon various factors, including processing resources available to the tracking system 5, expected signal intercept rates for the source, a scan rate for the receiver, and/or other factors. For example, windows may be established upon receipt of each signal intercept event 53. The signal intercept 53 history that falls within the start and stop limits of the window is then evaluated to determine whether or not the source 2 is actively tracking the object 1. Since the signal intercept event 53 rate may be dependent on the scan strategy, the window size may vary among different source signals to establish appropriate count thresholds. Since the scan strategy may be known, the intercept rate can be derived and the appropriate window size may be established a priori.

In this embodiment, windows 3 are constructed by the analyzer 51 for each signal interept event 53. For example, the windows 3b, 3c and 3d show consecutive windows used by the analyzer 51 when determining whether the source 2 is tracking the object 1. (For clarity, not all of the windows 3 used by the analyzer 51 in this embodiment are shown in FIG. 3. Rather, only selected windows are shown for purposes of description.) Rather than triggering on a signal intercept event 53, an alternative embodiment could "slide" the window over time, generating the additional windows 3a and 3b. However, for the windows 3a and 3b, no signal intercepts 53 are reported to the analyzer 51 since the signal amplitude is below the detection threshold of the receiver 4. To avoid the signal intercept 53 triggering approach from "latching" to the track state if the signal abruptly stops radiating, an overall inactivity time may be applied to force a break track indication if no events at all are received for a specified inactivity time.

When determining whether a source 2 is tracking the object 1, the analyzer 51 may determine whether a total number of signal intercepts 53 within a window 3 is below a break track count. (A number of signal intercepts during a window may be viewed as a number of signal intercepts over a window time period, or as a signal intercept rate. Below, a number of signal intercepts per window is used in the illustrated embodiment, but the analyzer 51 may use signal intercept rates for windows, signal intercept rate thresholds, etc., in its analysis.) A total number of signal intercepts 53 below the break track count may indicate that the source 2 is not actively targeting the object 1, and therefore a break track indication indicating that the source is not actively tracking the object may be provided by the tracking system 5. The break track count may vary depending on the characteristics of the source. For example, some threat sources 2 may actively track an object by emitting tracking signals in the object's direction at a lower rate than other threat sources. Thus, the break track count for the former threat source may be lower for a given window size than the latter threat source. As discussed above, the tracking system 5 may store individualized criteria for a plurality of sources, such as the break track count for each source, in the source identification store 52.

Taking window 3c as an example, window 3c includes two signal intercepts 53. Thus, if the break track count for this source is greater than 2, the tracking system 5 may determine that the source is not actively tracking the object and provide a break track indication. However, taking window 3d as an example, window 3d includes 11 signal intercepts 53. Thus, if the break track count for the source is 11 or less, the tracking system 5 may determine that it cannot rule out the possibility that the source is actively tracking the object, and may perform further analysis on the window 3d.

Such further analysis may include determining if a number of signal intercepts in the window is greater than a track count. (Track count information may be stored in the source identification store 52 for a plurality of sources.) The track count may be different than the break track count, and signal intercept counts above the track count may indicate that the source is actively tracking the object. For example, if the track count for the source whose signals are shown in FIG. 3, is less than 11, the tracking system 5 may provide a track indication that indicates that the source is actively tracking the object when analyzing window 3d. Like the break track count, the track count may be set at any suitable value and may be determined based on various factors, such as signal emission characteristics of the source. For example, it may be known that a particular source is actively tracking an object when it emits tracking signals toward an object more than a certain number of times in a given time period, e.g., corresponding to a window. This tracking signal rate, as modulated by the scan strategy, may be used to determine the track count used by the tracking system 5, i.e., signal intercept counts above the known tracking signal rate may indicate that the source is tracking the object. Of course, the track count may be different for different sources, and thus this information may be stored in the source information store 52 and used by the analyzer 51 for a corresponding source.

The track count may be made greater than the break track count so as to provide a count hysteresis function, e.g., helping to prevent the tracking system 5 from thrashing or toggling between track and break track indications. Frequent switching between track and break track indications may be distracting to a pilot or other operator of the object 1, or may cause other problems, such as to the automated countermeasure systems employed by the object 1.

The tracking system 5 may use additional analyses and/or criteria when determining whether to provide a track indication. For example, the tracking system 5 may determine whether the amplitude of at least one signal intercept 53 in a window is above a suitable threshold, such as the high threshold shown in FIG. 3. If not, the tracking system 5 may determine that no change in state indication should be made. For example, if a current window 3 does not include a signal intercept 53 having an amplitude above the high threshold, and the tracking system 5 previously indicated that the source is not actively tracking the object, the tracking system 5 may maintain the current break track state for the source. This arrangement may be implemented when it is believed unlikely that the source is actively tracking the object when no signal exceeding the high threshold has been received. Taking the window 3g as an example, even though the window 3g includes 8 signal intercepts, and assuming the track count is less than 8, the tracking system 5 may not provide a track indication because the window 3g does not include any signal intercept 53 with an amplitude that exceeds the high threshold. However, if a window 3 does include a signal intercept 53 with an amplitude above the high threshold and the tracking system 5 has previously provided a tracking indication, the tracking system 5 may still maintain a track indication state even if the number of intercepts in the window is less than the track count. Such an arrangement may provide an additional hysteresis effect to help prevent the tracking system from too rapidly switching between break track and track indication states.

Alternately, or in addition, when determining whether the number of intercepts in the window 3 exceeds the track count, the tracking system 5 may only count those signal intercepts 53 that have an amplitude above a specified threshold, such as the low threshold shown in FIG. 3. Using the window 3d as an example, although the window 3d includes 11 total signal intercepts 53, only 8 of the signal intercepts 53 have an amplitude above the low threshold. Thus, the tracking system 5 may compare only the number of signal intercepts 53 having an amplitude above the low threshold to the track count. Of course, it should be understood that the use of the high and low thresholds in this example (or similar arrangements) may be combined together in the analysis used by the tracking system 5. In addition, although the high threshold in this embodiment is larger in an absolute sense than the low threshold, in other embodiments, the high and low thresholds may be equal to each other.

Alternately, or in addition, the amplitude comparison thresholds may be shifted above their initial a priori values for the high and low thresholds. FIG. 3 illustrates the case in which peak signal amplitude matches the design threshold closely. This is indicated by the peak amplitudes within windows 3d, 3e and 3h aligning very closely with the high threshold. If however, the source 2 is at a much closer range than anticipated, all or many more signal intercept events may exceed the high threshold, allowing a false alarm. To avoid this condition, the high threshold may be allowed to increase and follow observed peak amplitudes of the signal intercepts 43 that exceed the a priori established high threshold, and the low threshold may be kept at a fixed value below the high threshold. In this manner, the thresholds may track with changes in signal intercept events, and may not be allowed to fall below minimum design values.

Figure 4:
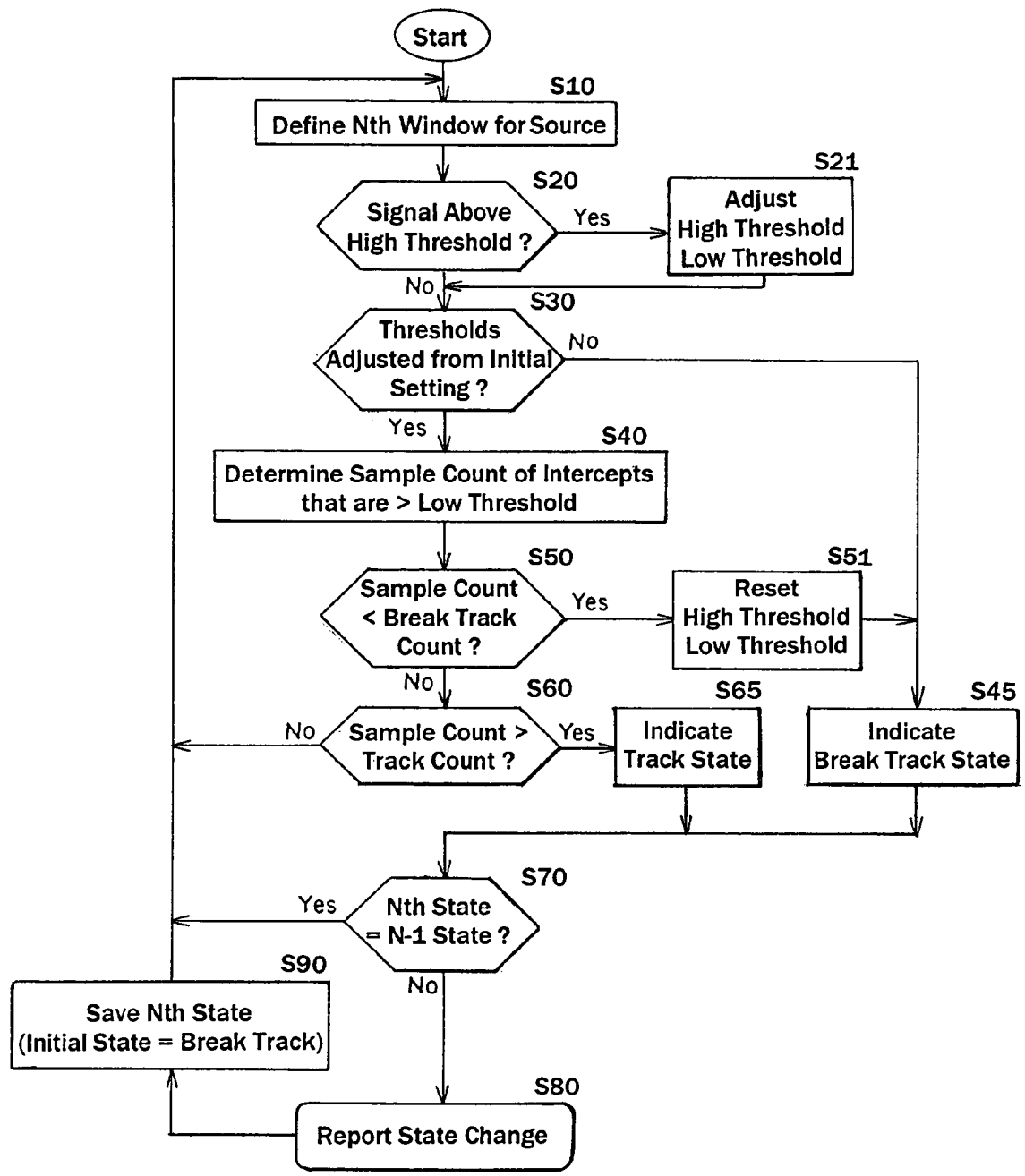
FIG. 4 is a flow chart showing steps in a method for evaluating a threat source in accordance with an aspect of the invention.

FIG. 4 shows a flow chart of a method for analyzing signal intercepts for a source in accordance with the invention. In step S10, a window is defined for a particular source. As discussed above, although only a single window for a single source is defined in this illustrative flow chart, the analyzer 51 may define windows for a plurality of different sources and perform an analysis of each window to determine whether or not the corresponding source is actively targeting the object. The time period over which the window spans may be determined based on stored information for the particular source in question. The window width may be determined based on the reaction or response time for the object and/or the scan strategy for the receiver. The reaction or response time for the object may relate to a time period required for appropriate evasive action or other countermeasures to be deployed in a timely manner so as to successfully avoid a threat to the object. For example, the reaction or response time may include time for a pilot or other object operator to respond to threat information and initiate countermeasures, an expected time that the threat source may take to launch a weapon once tracking of the object has begun, an estimated time for actuated countermeasures to be effective (e.g., a time for the object to execute evasive maneuvers to cause the threat source to break its tracking ability), and so on. In general, window width and/or spacing between consecutive windows will be short enough to allow the object to at least have a reasonable chance of thwarting the threat source's ability to track the object by employing one or more countermeasures. The receiver scan strategy may affect window width because if the receiver only scans in a direction of a threat source for a relatively small period of time during each scan cycle, the window may need to be widened in order to include a suitable number of signal intercepts, or at least provide enough time for potential signal intercepts, to be included in the window. Alternately, a scan strategy that frequently looks for signals in a direction of a threat source may enable the window width to be narrowed. Thus, the window width may be adjusted in accordance with changes in the scan strategy of the receiver, if any. Using the window width and start time, the signal intercepts for the source being analyzed may be grouped together into the window for analysis.

In some cases, a source may use a plurality of different frequency beams for searching and/or tracking. For example, a source may use two or more beams for searching purposes and two or more beams for tracking purposes. Signal intercepts for all of these different beams may be grouped, or OR'd, together into a common window for the source. Thus, although a source may use multiple beams, e.g., with different frequencies, in multiple operation modes, the system may group signal intercepts from the various beams into a common window that is analyzed to determine whether the source is tracking an object.

In step S20, a decision is made as to whether or not sufficient signal intercept amplitude has been measured to initiate a track/break track evaluation. For example, if a high threshold amplitude is met or exceeded, a determination may be made that the source 2 of the signal intercepts has met a first criterion of potentially being a track threat. (Information for analyzing signal intercepts from a particular source, such as high and low threshold, track count, break track count, window size, etc. may be stored for a plurality of different sources and may be retrieved from a store, such as the source information store 52.) Taking window 3d in FIG. 3 as an example, the high threshold is crossed with the fifth signal intercept event 53, causing control to flow to step S21. In step S21, the high threshold used for future window evaluation may be adjusted so as to equal the peak amplitude observed in the window (in this example using window 3d, the amplitude of the fifth signal intercept in the window may be used for the high threshold). The low threshold may also be adjusted, e.g., to a fixed value below the newly set high threshold. By making this adjustment, an amplitude range may be established that closely tracks the observed peak amplitude range. As discussed above, the high threshold may be set at any suitable value, e.g., so as to relatively reliably indicate that the source is more likely than not to be radiating sufficient power to actively track the object 1. Thus, the high threshold need not be set at a value equal to a peak amplitude detected in a window, but may be set at some other value above or below the peak amplitude, such as an average signal amplitude in the window, a step value above the prior high threshold value, etc. The low threshold may also be set at any suitable value, and in absolute terms may set below or at the high threshold.

In step S20, if no signal in the window exceeds the high threshold, control may flow to step S30. For example, considering window 3g, no signal intercept has an amplitude above the high threshold, causing flow to jump to step S30 without any change in the high or low threshold.

In step S30, a determination is made whether the high or low thresholds have been changed from initial starting values for the high and low thresholds for the source. Such change may have occurred in the current window evaluation, e.g., immediately prior in step S21, or may have occurred during evaluation of a prior window. If the high or low thresholds have not been adjusted, the window evaluation logic is circumvented to step S45. Otherwise, in step S40, the number of signal intercepts in the window that are above the low threshold is determined. For example, for the window 3d, the number of such signal intercepts is 9 of a total of 11 signal intercepts. Using the window 3e as an example, eight signal intercepts have an amplitude above the low threshold, whereas window 3f has one signal intercept above the low threshold, and window 3g has four intercepts above the low threshold. If adjusted, the adjusted low threshold may be used when determining the number of signal intercepts above the low threshold in step S40.

In step S50, the sample count established in step S40 is compared to the break track count. If the number of intercepts in step S40 is below the break track count, the high and/or low thresholds may be reset in step S51 to an original or initial setting (e.g., an initial starting value stored in the source identification store 52 and used in step S30), and control flows to step S45. The break track count may be determined based on known or expected information about the source 2, such as an expected number of signal intercepts during the window below which the source is very unlikely to be actively tracking the object 1. Using windows 3e and 3f as examples, if the break track count is 5, the window 3e may be found to have a number of intercepts that is greater than the break track count, causing control to flow to step S60, whereas for window 3f, the total number of intercepts is less than the break track count, causing control to flow to step S51.

In step S60, the sample count of signal intercepts identified in step S40 is compared to a track count. If the number of signal intercepts is above the track count threshold, control flows to step S65. Otherwise, control jumps back to step S10. As an example, if the track count is 7, analysis of window 3e may result in a determination that the number of intercepts from step S40 (8) is greater than the track count (7), resulting in control flowing to step S65. However, for windows 3f and 3g, the number of intercepts above the low threshold is less than the track count, the current state is maintained and control jumps back to step S10.

Steps S45 and S65 are used to trigger a potential change in track state indication to break track or track, respectively. In step S70, a determination is made whether the track state to be indicated for the current window (N) is the same as the track state for the previous window (N-1). For example, if control flows from step S45, a determination is made in step S70 whether the state for the previous window was break track or not. If control flows from step S65, a determination is made in step S70 whether the state for the previous window was track or not. If the input state (the state for the current window N) to step S70 is different from the previous reported state (the state for the previous window N-1), the state change and new state is reported in step S80. The newly reported state is retained for future comparisons at step S90, and control jumps back to step S10. If in step S70 it is determined that the same state was observed for the current window as the previous window, no report is made and control jumps back to step S10. For example, if the previous state (for window N-1) was a track state and control flows from step S45 to step S70, then a change in state would be reported in step S80. However, if the previous state was a break track state and control flows from step S45 to step S70, then no change in state is determined, and control jumps back to step S10.

Serially applying the analysis shown in FIG. 4 to the windows 3 in FIG. 3, the tracking system 5 will provide a break track indication for windows 3a, 3b and 3c, assuming that the break track count is greater than 2, e.g., where the break track count equals 6. However, in window 3d, the total number of signal intercepts is greater than the break track count, at least one signal in the window is above the high threshold and the total number of intercepts above the low threshold is greater than the track count, e.g., where the track count equals 8. Thus, the tracking system 5 will provide a track indication representing that the source is actively tracking the object. In window 3e, the track state will be maintained. However, for the window 3f, the total number of intercepts in the window (4) is less than the break track count, and thus a break track indication is provided. In window 3g, the total number of intercepts in the window is greater than the break track count, but none of these signals are above the high threshold and the source is not currently indicated to be in a track state; thus, the current break track state is maintained. In window 3h, the total number of intercepts in the window is greater than the break track count, at least one signal intercept is above the high threshold, and the number of intercepts above the low threshold is greater than the track count, thus causing the tracking system to provide a track indication.

Figure 5:
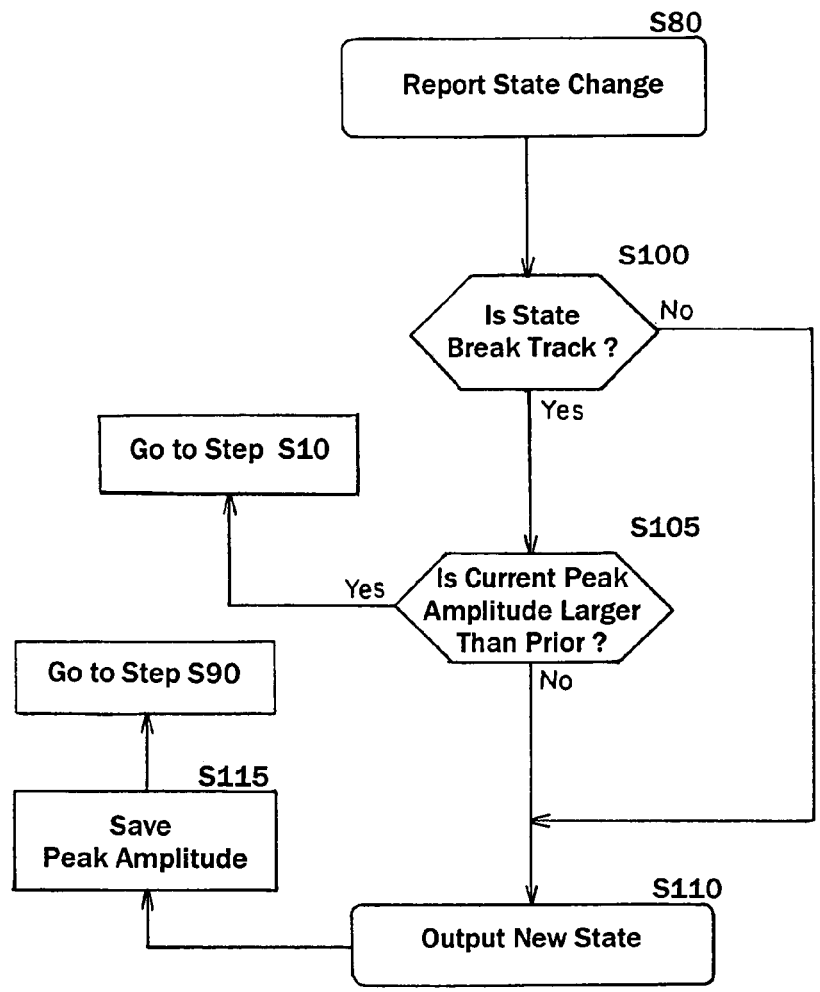
FIG. 5 is a flow chart showing steps in a method for conditioning an evaluated threat source in accordance with an aspect of the invention.

FIG. 5 shows a flow chart of a method for conditioning the response of the method shown in FIG. 4. The flow chart of FIG. 4 may have characteristics of a transition detector, and as such and for certain values of track count and amplitude, may output a transitory break track state for an increase in amplitude for which suppression is desirable. In step S100, the result of step S80 is evaluated. If the state to be reported is a track state, then the state can be immediately reported in step S110. Otherwise, in step S105 the current peak amplitude of the signal intercepts in the window are compared to the prior reported peak amplitude. If the current peak amplitude is greater, a break track report is suppressed and control jumps to step S110 so as to maintain the current track state. Otherwise, the break track state indication may be immediately reported in step S110. For each state reported in step S110, the peak amplitude may be stored in step S115, e.g., for further use in step S105 when evaluating later windows. Thereafter, control flows to step S90.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A threat evaluation system comprising:
a receiver associated with an object, the receiver adapted to implement a scan strategy including a dwell arrangement to receive signals emitted by one or more threat emitters, the signals being emitted by the one or more threat emitters to locate the object or similar items; and
a tracking system that receives information from the receiver regarding received signals, the tracking system analyzing signals from a threat emitter to provide a track indication that the threat emitter is actively tracking the object without adjusting the dwell arrangement of the scan strategy of the receiver.

2. The system of claim 1, wherein the receiver provides intercept reports regarding signals received from identified threat emitters.

3. The system of claim 1, wherein the tracking system receives information from the receiver regarding amplitude and time of arrival of signals received from the threat emitter.

4. The system of claim 3, wherein the tracking system provides the track indication when an intercept rate of signals received from the threat emitter exceeds a track rate for the threat emitter.

5. The system of claim 4, wherein the tracking system provides the track indication when the intercept rate of signals received from the threat emitter exceeds a track rate for the threat emitter, and where each of the signals received from the threat emitter has an amplitude that exceeds a threshold.

6. The system of claim 1, wherein the tracking system is adapted to provide track indications for a plurality of threat emitters without adjusting the dwell arrangement of the scan strategy of the receiver.

7. The system of claim 1, wherein the receiver provides an indication of one or more signals received from the threat emitter; and
wherein the tracking system analyzes the one or more signals from the threat emitter and provides a track indication that the threat emitter is actively tracking the object when a sample count of signals received from the threat emitter is greater than a track count during a window, and provides a break track indication that the threat emitter is not actively tracking the object when a number of signals from the threat emitter is less than a break track count during a window.

8. The system of claim 7, wherein the track indication is provided when the sample count of signals is greater than the track count during the window, and where each of the signals has a signal amplitude exceeding a threshold.

9. The system of claim 1, wherein the object is an airplane, a helicopter, vessel or other suitable vehicle or platform.

10. A threat evaluation system comprising:
a receiver associated with an object, the receiver adapted to receive signals emitted by one or more threat emitters, and providing an indication of at least one signal intercept from a threat emitter based on one or more signals received from the threat emitters, the signals being emitted by the one or more threat emitters to locate the object or similar items; and
a tracking system that receives information from the receiver regarding signal intercepts, the tracking system analyzing at least one signal intercept from the threat emitter and providing a track indication that the threat emitter is actively tracking the object when a sample count of signal intercepts from the threat emitter is greater than a track count during a window, and providing a break track indication that the threat emitter is not actively tracking the object.

11. The system of claim 10, wherein the track indication is provided when the sample count of signal intercepts, each having a signal amplitude exceeding a low threshold, is greater than the track count during the window.

12. The system of claim 11, wherein the tracking system only includes signal intercepts in the sample count for a window if the receiver detects a signal amplitude for a signal intercept that is greater than a high threshold, where the high threshold is greater than the low threshold.

13. The system of claim 12, wherein after a break track indication is provided, the tracking system does not provide a track indication until the receiver detects a signal amplitude for a signal intercept that is greater than a high threshold, where the high threshold is greater than the low threshold.

14. The system of claim 13, wherein the tracking system adjusts the high threshold based on a peak signal amplitude in the window.

15. The system of claim 10, wherein the break track indication is provided when a number of signal intercepts from the threat emitter is less than a break track count during a window.

16. The system of claim 10, wherein the tracking system is adapted to provide tracking indications and break track indications for a plurality of threat emitters.

17. The system of claim 10, wherein the receiver includes a library identification system adapted to determine from at least one signal intercept a threat emitter type, an association of the at least one signal intercept with a previously identified threat emitter, and/or whether the threat emitter is in a track or scan mode.

18. The system of claim 10, wherein the tracking system is adapted to use customized information for each of a plurality of threat emitters when analyzing at least one signal intercept from the threat emitter, the customized information including information regarding an expected signal amplitude of the threat emitter when in tracking mode, an expected rate of signal intercept for the threat emitter when in tracking mode, a low threshold for the threat emitter, a track count for the threat emitter, a break track count for the threat emitter, a high threshold for the threat emitter, and/or a window size for the threat emitter.

19. The system of claim 10, wherein if the tracking system previously provided a track indication for a prior window, the tracking system does not subsequently provide a break track indication for a next window if a peak amplitude for signal intercepts in the next window is larger than a peak amplitude for signal intercepts in the prior window.

20. A method of identifying one or more threats to an object, comprising:

implementing a scan strategy for a receiver, the scan strategy including a dwell arrangement defining one or more time periods during which the receiver is intended to receive signals from one or more directions;

receiving, at the receiver, signals emitted by one or more threat emitters, the signals being emitted by the one or more threat emitters to locate an object associated with the receiver; and providing, based on the received signals, a track indication that at least one threat emitter is actively tracking the object without adjusting the dwell arrangement of the scan strategy for the receiver.

* * * * *